(12) United States Patent
Masaaki et al.

(10) Patent No.: US 11,387,562 B2
(45) Date of Patent: Jul. 12, 2022

(54) ELECTROMAGNETIC WAVE TRANSCEIVING APPARUTUS

(71) Applicant: EIKO Techno Corp., Suwa (JP)

(72) Inventors: Yasukawa Masaaki, Suwa (JP); Lu Ming, New Taipei (TW); Ng Yat Tung, Siu Sai Wan (HK)

(73) Assignee: EIKO TECHNO CORP, Suwa (JP)

( * ) Notice: Subject to any disclaimer, the term of this patent is extended or adjusted under 35 U.S.C. 154(b) by 51 days.

(21) Appl. No.: 17/093,150

(22) Filed: Nov. 9, 2020

(65) Prior Publication Data

US 2021/0305705 A1     Sep. 30, 2021

Related U.S. Application Data (60) Provisional application No. 62/993,928, filed on Mar. 24, 2020.

(51) Int. Cl.
| | |
|---|---|
| *H04B 1/40* | (2015.01) |
| *H01Q 9/04* | (2006.01) |
| *H01Q 1/24* | (2006.01) |
| *H04B 1/00* | (2006.01) |

(52) U.S. Cl.
CPC ............. *H01Q 9/0485* (2013.01); *H01Q 1/24* (2013.01); *H04B 1/0053* (2013.01)

(58) Field of Classification Search
CPC ....... H01Q 9/0485; H01Q 1/24; H04B 1/0053
USPC .......................................................... 455/77
See application file for complete search history.

(56) References Cited

U.S. PATENT DOCUMENTS

| | | | | |
|---|---|---|---|---|
| 3,866,234 A | * | 2/1975 | Gates, Jr ................ | H01Q 15/08 343/872 |
| 6,154,176 A | * | 11/2000 | Fathy ................... | H01Q 9/0414 343/846 |
| 6,195,049 B1 | * | 2/2001 | Kim ........................ | H01Q 1/38 343/702 |
| 6,320,547 B1 | * | 11/2001 | Fathy ...................... | H01Q 1/38 361/781 |

(Continued)

FOREIGN PATENT DOCUMENTS

| | | |
|---|---|---|
| CN | 101118985 A | 2/2008 |
| EP | 0378905 A1 | 1/1989 |

*Primary Examiner* — April G Gonzales
(74) *Attorney, Agent, or Firm* — Snyder, Clark, Lesch & Chung, LLP (57) ABSTRACT

An electromagnetic wave transceiving apparatus is disclosed, including a detection and control unit, an electromagnetic exciter, a dielectric adjustment unit, and a positioning unit. When the electromagnetic wave transceiving apparatus is coupled to a surface of an external dielectric body, the electromagnetic exciter, the dielectric adjustment unit, and the coupled external dielectric body constitute a resonator with a specific electromagnetic wave spectrum. Considering the influence of the external dielectric body to which the electromagnetic wave transceiving apparatus is coupled, when the electromagnetic wave transceiving apparatus is coupled to the surface of the external dielectric body, the electromagnetic exciter, the dielectric adjustment unit, and the coupled external dielectric body may adjust the electromagnetic exciter and the dielectric adjustment unit to form a resonator with the required frequency through the detection and control unit.

11 Claims, 7 Drawing Sheets

(56) References Cited

U.S. PATENT DOCUMENTS

| | | | |
|---|---|---|---|
| 6,580,402 B2* | 6/2003 | Navarro | H01Q 21/0093 |
| | | | 333/137 |
| 6,650,303 B2* | 11/2003 | Kim | H01Q 11/08 |
| | | | 343/895 |
| 6,750,820 B2* | 6/2004 | Killen | H01Q 9/065 |
| | | | 343/795 |
| 6,825,819 B2* | 11/2004 | Kim | H01Q 11/08 |
| | | | 343/895 |
| 7,122,891 B2* | 10/2006 | Dishongh | H01L 23/66 |
| | | | 257/E23.101 |
| 7,136,021 B2* | 11/2006 | Huang | H01Q 1/2283 |
| | | | 343/702 |
| 8,154,464 B2* | 4/2012 | Gonda | C04B 35/2633 |
| | | | 252/62.63 |
| 8,178,457 B2* | 5/2012 | de Rochemont | H01Q 5/307 |
| | | | 501/154 |
| 8,497,804 B2* | 7/2013 | Haubrich | H01Q 1/27 |
| | | | 607/60 |
| 8,952,858 B2* | 2/2015 | de Rochemont | H01Q 9/16 |
| | | | 343/803 |
| 10,224,630 B2* | 3/2019 | Iellci | H01Q 5/328 |
| 10,542,733 B2* | 1/2020 | Wang | H05B 3/80 |
| 2009/0195827 A1* | 8/2009 | Kimura | H04W 72/082 |
| | | | 358/1.15 |
| 2017/0237449 A1* | 8/2017 | Stambovsky | H01Q 1/28 |
| | | | 455/77 |
| 2022/0015112 A1* | 1/2022 | Chen | H04W 4/80 |

* cited by examiner

The electromagnetic wave spectrum of the first spectrum generated by the electromagnetic exciter

FIG. 4

The electromagnetic wave spectrum of the second spectrum through the dielectric adjustment unit

FIG. 5

The electromagnetic wave spectrum of the third spectrum through the jointed external dielectric body

FIG. 6

FIG. 7

ELECTROMAGNETIC WAVE TRANSCEIVING APPARUTUS

CROSS-REFFERENCE TO RELATED APPLICATION

This application claims priority to and the benefit of, pursuant to 35 U.S.C. § 119, U.S. provisional patent application Ser. No. 62/993,928 filed on Mar. 24, 2020, the disclosure of which is incorporated herein in its entirety by reference.

BACKGROUND

1. Technical Field

The present disclosure relates to a transceiving apparatus for electromagnetic wave signals.

2. Description of the Related Art

Figure 3:
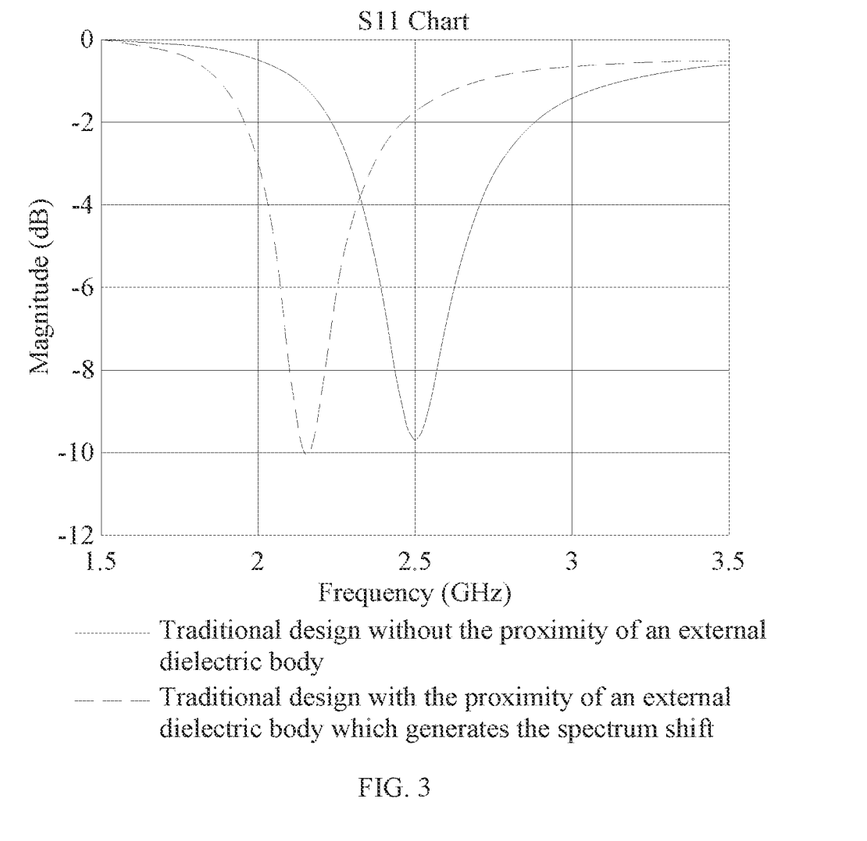
FIG. 3 is a schematic diagram of an existing electromagnetic wave transceiving apparatus at a working frequency of 2.5 GHz affected by the occurrence of the spectrum shift when the dielectric material approaches in the environment.

Existing RF electromagnetic wave transceiving apparatuses mainly use conductive materials to form a specific shape and size to transmit or receive an electromagnetic wave of a specific spectrum. The examples are patents or patent applications such as EP0378905A1, U.S. Pat. Nos. 10,224,630, 7,136,021, 6,825,819, 6,580,402, 8,178,457, 7,122,891, CN101118985, U.S. Pat. Nos. 3,866,234, 6,154, 176, 6,320,547, 6,650,303, 8,154,464, 6,750,820, 6,195,049, 8,497,804, and 8,952,858. The signal transceiving performance of such apparatuses may be affected by approximating other dielectric objects or contacting with other dielectric materials and conductive materials in an environment. Thus, in practical applications, problems of spectrum shift and performance attenuation during signal transmission due to different environments. Referring to FIG. 3, the figure refers to a schematic diagram of an existing electromagnetic wave transceiving apparatus at a working frequency of 2.5 GHz affected by the occurrence of the spectrum shift when the dielectric material approaches in the environment. As shown in the figure, the proximity of dielectric bodies in the environment may cause the effect of the spectrum shift.

SUMMARY

To solve the technical problem due to the existing defects of the electromagnetic wave transceiving apparatus in the prior art, the present disclosure provides an electromagnetic wave transceiving apparatus whose performance of electromagnetic wave transmission is not affected by the contact of dielectric materials.

According to one objective of the present disclosure, an electromagnetic wave transceiving apparatus is provided, including a detection and control unit, an electromagnetic exciter, a dielectric adjustment unit, and a positioning unit. Specifically, the detection and control unit is configured to detect a voltage standing wave ratio or a reflection coefficient; the electromagnetic exciter is connected to the detection and control unit, the detection and control unit adjusts a spectrum of an electromagnetic wave sent by the electromagnetic exciter, and the electromagnetic exciter is configured to generate and receive the electromagnetic wave. The dielectric adjustment unit is connected to the electromagnetic exciter. The positioning unit is configured to couple and fix the electromagnetic wave transceiving apparatus to a surface of an external dielectric body; the electromagnetic exciter, the dielectric adjustment unit, and the surface of the external dielectric body constitute a resonator with a specific electromagnetic wave spectrum when the electromagnetic wave transceiving apparatus is fixed to the surface of the external dielectric body.

When the electromagnetic wave transceiving apparatus emits an electromagnetic wave, the electromagnetic exciter generates an electromagnetic wave of a first spectrum, and the electromagnetic wave of the first spectrum is transmitted to the dielectric adjustment unit and adjusted as an electromagnetic wave of a second spectrum; the electromagnetic wave of the second spectrum enters the coupled external dielectric body and is transmitted to the surface of the external dielectric body to form an electromagnetic wave of a third spectrum and emitted to the outside. When the electromagnetic wave transceiving apparatus receives an electromagnetic wave, the electromagnetic wave of the third spectrum enters the dielectric adjustment unit via the coupled external dielectric body from the outside and then is adjusted as the electromagnetic wave of the second spectrum, and the electromagnetic wave of the second spectrum is sent to the electromagnetic exciter and adjusted as the electromagnetic wave of the first spectrum.

Preferably, the electromagnetic exciter may be a monopole-type, dipole-type, slot-type, spiral-type, or patch-type electromagnetic exciter.

Preferably, the electromagnetic exciter is configured to transmit or receive an electromagnetic wave of at least one spectrum.

Preferably, the electromagnetic exciter may be configured to adjust and transmit or receive an electromagnetic wave of at least one spectrum.

Preferably, the dielectric adjustment unit may be a dielectric structure with a fixed dielectric constant, and the value of the dielectric constant of the dielectric adjustment unit ranges from 1 to 10000.

Preferably, the dielectric adjustment unit may be a dielectric structure of an adjustable dielectric constant, the detection and control unit is configured to control the dielectric constant of the dielectric adjustment unit, and the value of the dielectric constant of the dielectric adjustment unit ranges from 1 to 10000.

Preferably, the dielectric adjustment unit may be constituted by a plurality of dielectric bodies with different dielectric constants to form a composite dielectric adjustment unit, and the value of the equivalent dielectric constant of the composite dielectric adjustment unit ranges from 1 to 10000.

Preferably, the dielectric adjustment unit may have a thickness of 0.1 mm to 20 mm Preferably, the value of the dielectric constant of the external dielectric body may range from 1 to 100.

Preferably, the first spectrum may be the same as the second spectrum or the third spectrum.

Preferably, the second spectrum may be the same as the third spectrum.

Preferably, the dielectric adjustment unit may be partially interposed between the electromagnetic exciter and the surface of the coupled external dielectric body.

Preferably, the dielectric adjustment unit may further include at least one dielectric material layer, and the value of the dielectric constant of each layer is between 1 and 10000.

Preferably, the dielectric adjustment unit may further include a gap area.

Preferably, the gap area may be interposed between the dielectric adjustment unit and the surface of the coupled external dielectric body.

Preferably, the gap area may be disposed inside the dielectric adjustment unit without contacting the surface of the external dielectric body.

Preferably, the positioning unit may be partially interposed between the dielectric adjustment unit and the surface of the coupled external dielectric body.

Preferably, the positioning unit may further include at least one dielectric material layer, and the value of the dielectric constant of each layer is between 1 and 10000.

Preferably, the positioning unit may further include a gap area.

According to the electromagnetic wave transceiving apparatus proposed by the present disclosure, considering the influence of the external dielectric body to which the electromagnetic wave transceiving apparatus is coupled, when the electromagnetic wave transceiving apparatus is coupled to the surface of the external dielectric body, the electromagnetic exciter and the dielectric adjustment unit may be adjusted by the detection and control unit such that the electromagnetic exciter, the dielectric adjustment unit, and the coupled external dielectric body may form a resonator with the required frequency. Therefore, the transmission and reception performance of electromagnetic signals may not be affected by the contacted dielectric material.

BRIEF DESCRIPTION OF THE DRAWINGS

The present disclosure is further described below together with the accompanying drawings and embodiments, in the accompanying drawings.

DESCRIPTION OF THE PREFERRED EMBODIMENTS

To illustrate the technical features, contents, advantages, and achievable effects of the present disclosure, the embodiments together with the drawings are described in detail as follows. However, the drawings are used only for the purpose of indicating and supporting the specification, which is not necessarily the real proportion and precise configuration after the implementation of the present disclosure. Therefore, the relations of the proportion and configuration of the attached drawings should not be interpreted to limit the actual scope of implementation of the present disclosure.

Figure 1A:
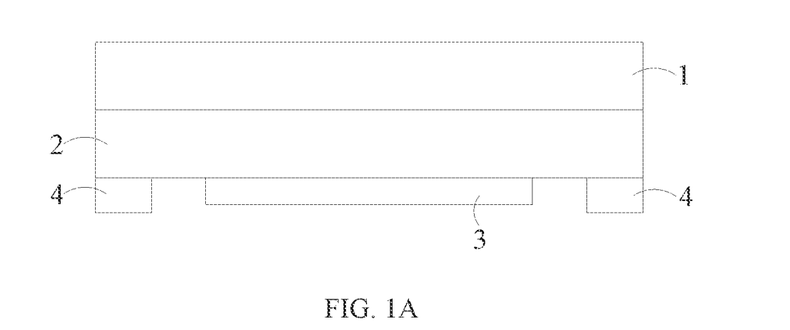
FIG. 1A is a schematic diagram of the electromagnetic wave transceiving apparatus according to an embodiment of the present disclosure.

Referring to FIG. 1A, which is a schematic diagram of the electromagnetic wave transceiving apparatus according to an embodiment of the present disclosure. As shown in the figure, the electromagnetic wave transceiving apparatus may be used for communication or transmitting and receiving electromagnetic waves as a radar. The electromagnetic wave transceiving apparatus of the embodiment includes a detection and control unit 1, an electromagnetic exciter 2, a dielectric adjustment unit 3, and a positioning unit 4. Specifically, the electromagnetic exciter 2 is connected to the detection and control unit 1, the dielectric adjustment unit 3 is connected to the electromagnetic exciter 2, and the positioning unit 4 couples the apparatus with the surface of the external dielectric body. The VSWR (voltage standing wave ratio) bridge equivalent circuit may be utilized by the detection and control unit 1 to detect the voltage standing wave ratio or reflection coefficient to determine whether the apparatus matches the emission spectrum of the electromagnetic wave. The detection and control unit 1 may also be configured to adjust the electromagnetic wave spectrum emitted by the electromagnetic exciter 2. The electromagnetic exciter 2 is configured to generate and receive electromagnetic waves with the required spectrum, and the positioning unit 4 is configured to couple and fix the electromagnetic wave transceiving apparatus to a surface of an external dielectric body.

Figure 1B:
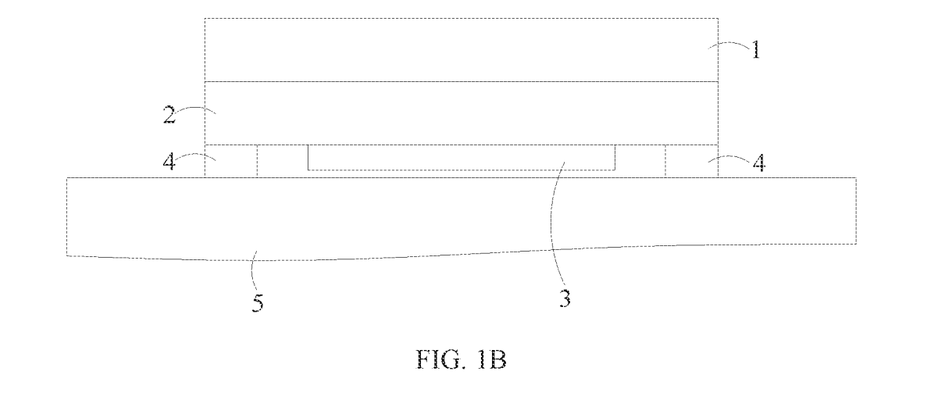
FIG. 1B is a schematic diagram of the electromagnetic wave transceiving apparatus being coupled to the surface of the external dielectric body shown in FIG. 1A.

Referring to FIG. 1B, which is a schematic diagram of the electromagnetic wave transceiving apparatus being coupled to the surface of the external dielectric body shown in FIG. 1A. As shown in the figure, when the electromagnetic wave transceiving apparatus is coupled to the surface of the external dielectric body 5, the electromagnetic exciter 2, the dielectric adjustment unit 3, the positioning unit 4, and the external dielectric body 5 together constitute a resonator with a specific electromagnetic wave spectrum. When the electromagnetic wave transceiving apparatus emits an electromagnetic wave, the electromagnetic exciter 2 generates an electromagnetic wave of a first spectrum, and the electromagnetic wave of the first spectrum is transmitted to the dielectric adjustment unit 3 and adjusted as an electromagnetic wave of a second spectrum; the electromagnetic wave of the second spectrum is transmitted to the coupled external dielectric body 5 to form an electromagnetic wave of the third spectrum and be emitted to the outside.

Figure 4:
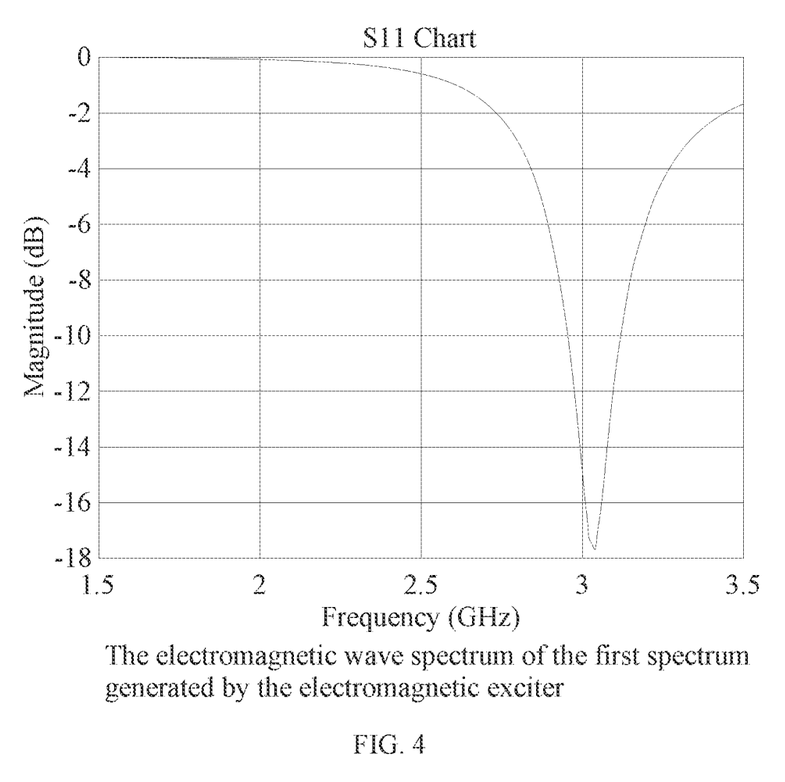
FIG. 4 is an S11 chart of the first spectrum generated by the electromagnetic exciter in the electromagnetic wave transceiving apparatus according to an embodiment of the present disclosure.
Figure 5:
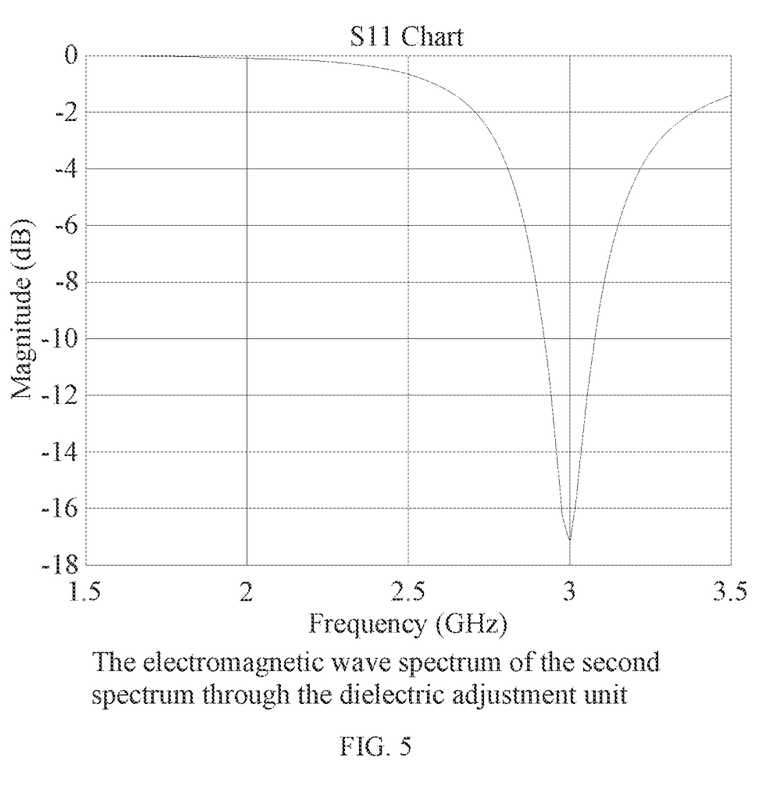
FIG. 5 is an S11 chart of the second spectrum emitted after an adjustment by the dielectric unit in the electromagnetic wave transceiving apparatus according to an embodiment of the present disclosure.
Figure 6:
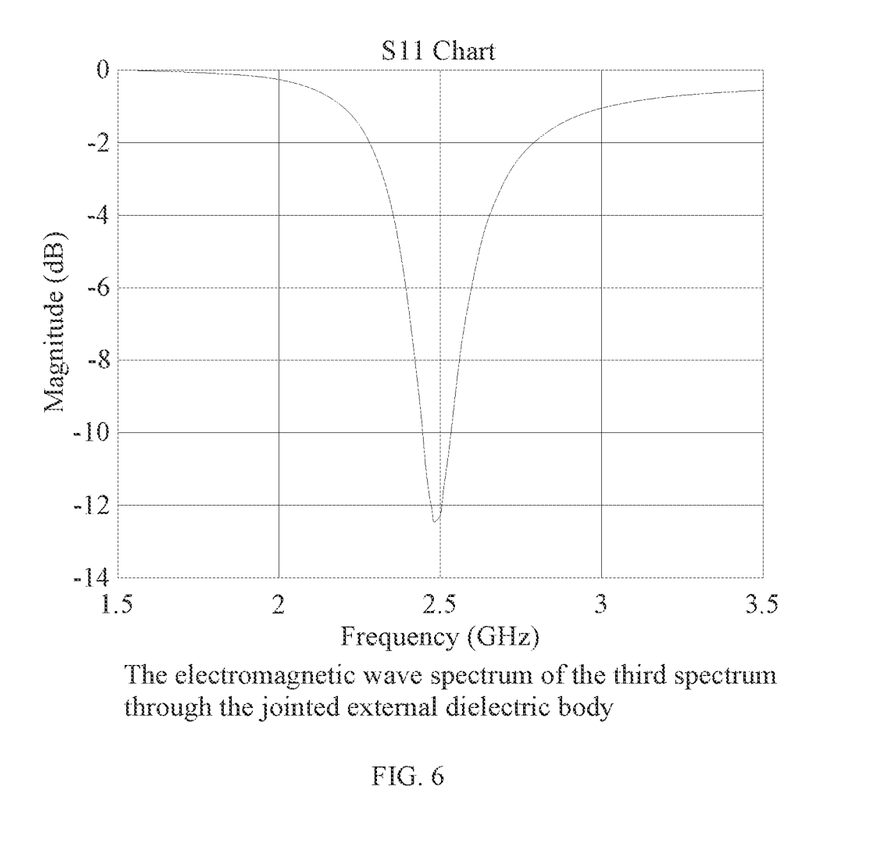
FIG. 6 is an S11 chart of the third spectrum emitted after the apparatus is coupled with the external dielectric body in the electromagnetic wave transceiving apparatus according to an embodiment of the present disclosure.

Referring to FIG. 4 to FIG. 6, which are charts illustrating the spectrums of the embodiments with 2.5 GHz as the target working frequency, wherein FIG. 4 is a chart of the electromagnetic wave spectrum of the first spectrum emitted by the electromagnetic exciter 2 in an embodiment of the present disclosure; FIG. 5 is a chart of the electromagnetic wave spectrum of the second spectrum generated after the electromagnetic wave of the first spectrum is transmitted to the dielectric adjustment unit 3; FIG. 6 is a chart of the electromagnetic wave spectrum of the third spectrum emitted from the surface of the external dielectric body after the second spectrum electromagnetic wave is transmitted to the coupled external dielectric body 5, and the electromagnetic wave of the third spectrum is the required working spectrum.

Figure 7:
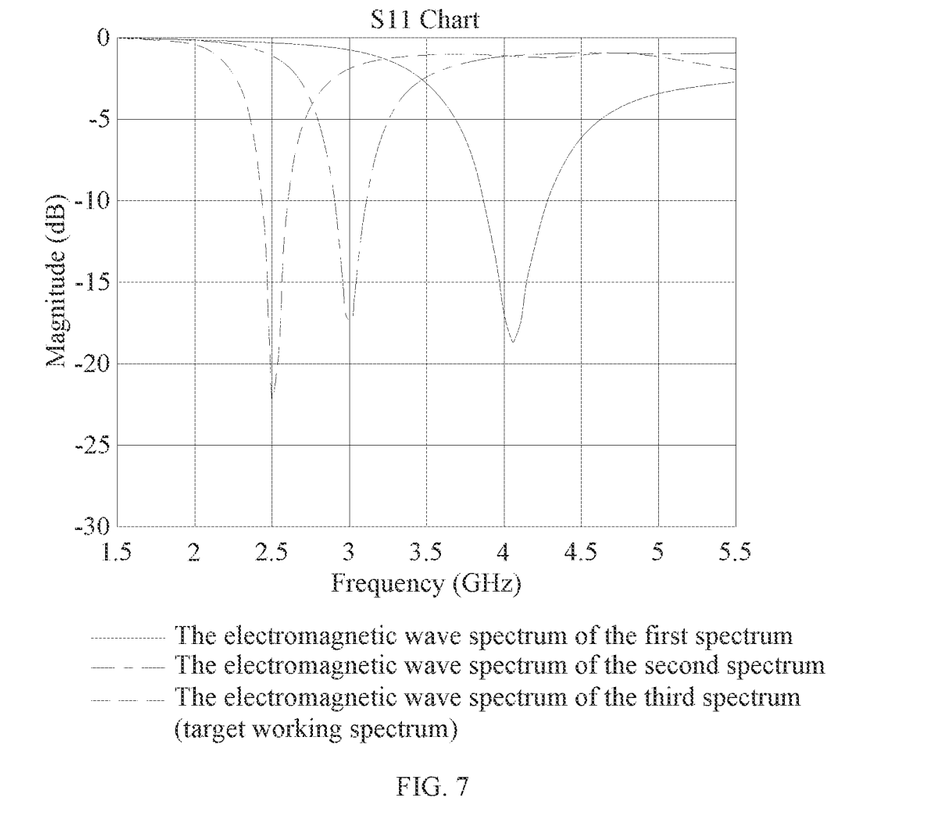
FIG. 7 is an S11 chart of the first to third spectrums in another embodiment with 2.5 GHz as the target frequency.

Referring to FIG. 7, the figure is a chart of the spectrums of the first to third spectrum electromagnetic waves with 2.5 GHz as the target frequency in another embodiment of the present disclosure. The electromagnetic wave of the third spectrum is transmitted to the dielectric adjustment unit 3 in the apparatus via the external dielectric body 5 coupled by the apparatus and then adjusted as the electromagnetic wave of the second spectrum. The electromagnetic waves of the second spectrum are transmitted to the electromagnetic exciter 2 and adjusted to the electromagnetic waves of the first spectrum for being received.

Figure 2:
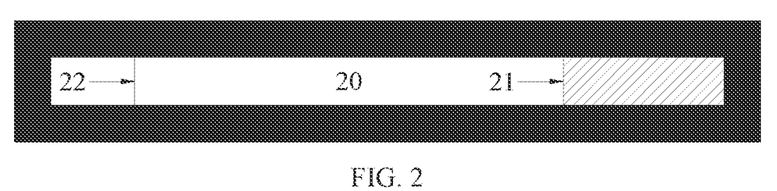
FIG. 2 is a structural schematic diagram of a slot-type electromagnetic exciter.

In an embodiment of the electromagnetic wave transceiving apparatus of the present disclosure, the detection and control unit 1 may be a VSWR (voltage standing wave ratio) bridge without being limited to the aforementioned circuit that may be configured to detect voltage standing wave ratio or reflection coefficient. The electromagnetic exciter 2 may be a monopole-type, dipole-type, slot-type, spiral-type, or patch-type electromagnetic exciter without being limited to the aforementioned electromagnetic exciter. The electromagnetic exciter may also be other conventional electromagnetic exciters suitable for transceiving electromagnetic waves. Referring to FIG. 2, which is a structural schematic diagram of a slot-type electromagnetic exciter, wherein numeral reference 20 refers to a slot, numeral reference 21 refers to a metal layer, and numeral reference 22 refers to a feed point. Using the metal layer 21 to shield the slot 20 may adjust the working frequency of the electromagnetic exciter 2 transceiving electromagnetic waves. The greater the duty cycle of the slot 20 is, the lower the working frequency would be; the smaller the duty cycle is, the higher the working frequency would be. By this method, the frequency of the electromagnetic waves which the electromagnetic exciter 2 transmits or receives may be adjusted.

In an embodiment of the electromagnetic wave transceiving apparatus of the present disclosure, the dielectric adjustment unit 3 may be a dielectric structure with a fixed dielectric constant, and the value of the dielectric constant thereof may range from 1 to 10000. The dielectric adjustment unit 3 may also be a dielectric structure of an adjustable dielectric constant, the detection and control unit 1 is configured to control the dielectric constant of the dielectric adjustment unit 3, and the value of the dielectric constant thereof may range from 1 to 10000. The dielectric adjustment unit 3 may be constituted by a plurality of dielectric bodies with different dielectric constants to form a composite dielectric adjustment unit, and the value of an equivalent dielectric constant thereof may range from 1 to 10000. The following are representative materials that may be used, but the present disclosure is not limited to these materials. The materials include low dielectric constant materials: PTI-B, PE, PC, PVC, Acrylic, PU, Epoxy, Silicone, etc.; medium dielectric constant materials: quartz, glass, aluminum oxide crystals and ceramics, aluminum nitride crystals and ceramics, silicon carbide crystals and ceramics, zirconium oxide crystals and ceramics, etc.; high dielectric constant materials: titanium oxide crystals and ceramics, barium titanate ceramics, polymer composites, etc. The mixture of these dielectric materials with high and low dielectric constants may be configured to manufacture the materials with the required dielectric constants for use by the dielectric adjustment unit. The thickness of the dielectric adjustment unit 3 may be 0.1 mm to 20 mm.

In an embodiment of the present disclosure, the positioning unit 4 may be, but is not limited to, constituted by at least one dielectric body. It may be configured to connect the electromagnetic wave transceiving apparatus and the surface of the external dielectric body by adopting resin, polymer adhesive, a sucking disk, and a vacuum suction device.

In an embodiment of the present disclosure, the value of the dielectric constant of the surface of the external dielectric body 5 is 1 to 100.

In an embodiment of the present disclosure, the first spectrum may be the same as the second spectrum or the third spectrum. In other embodiments, the second spectrum may be the same as the third spectrum.

In the electromagnetic wave transceiving apparatus of the present disclosure, considering the influence of the external dielectric body to which the electromagnetic wave transceiving apparatus is coupled, after the electromagnetic wave transceiving apparatus is coupled to the external dielectric body, the electromagnetic exciter 2 and the dielectric adjustment unit 3 may be adjusted by the detection and control unit 1 such that the composite structure constituted by the electromagnetic exciter 2, the dielectric adjustment unit 3, and the external dielectric body 5 may form a resonator with the required frequency. Therefore, the transmission and reception performance of electromagnetic signals may not be affected by the contacted dielectric material.

The embodiments of the present disclosure are described above with reference to the accompanying drawings, but the present disclosure is not limited to the aforementioned specific embodiments. The specific implementation as mentioned above is merely indicative rather than restrictive. Equivalent modifications or changes made by a person of ordinary skill in the art under the implication of the present disclosure, without departing from the spirit and scope of the present disclosure, shall be included in the following claims.

What is claimed is:

1. An electromagnetic wave transceiving apparatus, comprising:
a detection and control unit configured to detect a voltage standing wave ratio and a reflection coefficient;
an electromagnetic exciter connected to the detection and control unit, the electromagnetic exciter being configured to generate and receive electromagnetic waves, and the detection and control unit being configured to adjust spectrums of the electromagnetic waves generated by the electromagnetic exciter;
a dielectric adjustment unit connected to the electromagnetic exciter; and
a positioning unit configured to couple and fix the electromagnetic wave transceiving apparatus to a surface of an external dielectric body such that the electromagnetic exciter, the dielectric adjustment unit, and the surface of the external dielectric body constituting a resonator with a specific electromagnetic wave spectrum;
wherein emitting of the electromagnetic waves by the electromagnetic wave transceiving apparatus includes: generating an electromagnetic wave of a first spectrum by the electromagnetic exciter and transmitting the electromagnetic wave of the first spectrum to the dielectric adjustment unit, adjusting the electromagnetic wave of the first spectrum as an electromagnetic wave of a second spectrum by the dielectric adjustment unit, feeding the electromagnetic wave of the second spectrum to the coupled external dielectric body, and transmitting the electromagnetic wave of the second spectrum to the surface of the external dielectric body to form an electromagnetic wave of a third spectrum and emitting the electromagnetic wave of the third spectrum outside of the surface of the external dielectric body;
when receiving the electromagnetic waves by the electromagnetic wave transceiving apparatus includes: receiving the electromagnetic wave of the third spectrum from the coupled external dielectric body from the outside, adjusting the electromagnetic wave of the third spectrum as the electromagnetic wave of the second spectrum by the dielectric adjustment unit, and sending the electromagnetic wave of the second spectrum to the electromagnetic exciter and adjusting as the electromagnetic wave of the first spectrum.

2. The electromagnetic wave transceiving apparatus according to claim 1, wherein the electromagnetic exciter is a monopole-type, dipole-type, slot-type, spiral-type, or patch-type electromagnetic exciter.

3. The electromagnetic wave transceiving apparatus according to claim 1, wherein the electromagnetic exciter is configured to transmit or receive the electromagnetic waves of at least one spectrum.

4. The electromagnetic wave transceiving apparatus according to claim 1, wherein the electromagnetic exciter is configured to adjust and transmit or receive the electromagnetic waves of at least one spectrum.

5. The electromagnetic wave transceiving apparatus according to claim 1, wherein the dielectric adjustment unit is a dielectric structure with a fixed dielectric constant, and a value of the fixed dielectric constant of the dielectric adjustment unit ranges from 1 to 10000.

6. The electromagnetic wave transceiving apparatus according to claim 1, wherein the dielectric adjustment unit is a dielectric structure of an adjustable dielectric constant, the detection and control unit is configured to control the dielectric constant of the dielectric adjustment unit, and a value of the dielectric constant of the dielectric adjustment unit ranges from 1 to 10000.

7. The electromagnetic wave transceiving apparatus according to claim 1, wherein the dielectric adjustment unit is constituted by a plurality of dielectric bodies with different dielectric constants to form a composite dielectric adjustment unit, and a value of an equivalent dielectric constant of the composite dielectric adjustment unit ranges from 1 to 10000.

8. The electromagnetic wave transceiving apparatus according to claim 1, wherein the dielectric adjustment unit has a thickness of 0.1 mm to 20 mm.

9. The electromagnetic wave transceiving apparatus according to claim 1, wherein a value of a dielectric constant of the external dielectric body ranges from 1 to 100.

10. The electromagnetic wave transceiving apparatus according to claim 1, wherein the first spectrum is the same as the second spectrum or the third spectrum.

11. The electromagnetic wave transceiving apparatus according to claim 1, wherein the second spectrum is the same as the third spectrum.

* * * * *